United States Patent
Lee (10) Patent No.: US 10,557,994 B1
(45) Date of Patent: Feb. 11, 2020

(54) WAVEGUIDE GRATING WITH SPATIAL VARIATION OF OPTICAL PHASE

(71) Applicant: Facebook Technologies, LLC, Menlo Park, CA (US)

(72) Inventor: Hee Yoon Lee, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/139,820

(22) Filed: Sep. 24, 2018

(51) Int. Cl.
*G02B 6/34* (2006.01)
*G02B 5/18* (2006.01)
*G02B 27/01* (2006.01)

(52) U.S. Cl.
CPC .............. *G02B 6/34* (2013.01); *G02B 5/1809* (2013.01); *G02B 27/0172* (2013.01); *G02B 2027/0178* (2013.01)

(58) Field of Classification Search
CPC .................................. G02B 6/34; G02B 5/1809
See application file for complete search history.

(56) References Cited

U.S. PATENT DOCUMENTS

| | | | | |
|---|---|---|---|---|
| 9,791,703 | B1* | 10/2017 | Vallius | H04N 13/344 |
| 2002/0145960 | A1* | 10/2002 | Worthington | B01L 3/502715 369/47.48 |
| 2017/0299860 | A1* | 10/2017 | Wall | G02B 3/0062 |
| 2017/0299865 | A1* | 10/2017 | Vallius | G02B 6/0016 |

\* cited by examiner

*Primary Examiner* — Sung H Pak
(74) *Attorney, Agent, or Firm* — Matthew A. Pequignot; Evan J. Newman (57) ABSTRACT

An optical waveguide is disclosed. The optical waveguide includes a plate of transparent material comprising opposed first and second surfaces for guiding an optical beam between the surfaces by at least one of reflection or diffraction. A diffraction grating is disposed at the first surface for spreading the optical beam by diffracting portions thereof into a non-zero diffraction order to propagate inside the plate. The first diffraction grating includes an array of parallel grooves structured to provide a spatial variation of optical phase of the portions of the optical beam diffracted by the first diffraction grating into the non-zero diffraction order.

18 Claims, 10 Drawing Sheets

WAVEGUIDE GRATING WITH SPATIAL VARIATION OF OPTICAL PHASE

TECHNICAL FIELD

The present disclosure relates to optical components and modules, and in particular to optical waveguide based components and modules usable in display systems.

BACKGROUND

Head-mounted displays (HMDs), near-eye displays, and other kinds of wearable display systems can be used to provide virtual scenery to a user, or to augment a real scenery with additional information or virtual objects. The virtual or augmented scenery can be three-dimensional (3D) to enhance the experience and to match virtual objects to the real 3D scenery observed by the user. In some display systems, a head and/or eye position and orientation of the user are tracked in real time, and the displayed scenery is dynamically adjusted depending on the user's head orientation and gaze direction, to provide experience of immersion into a simulated or augmented 3D environment.

It is desirable to reduce size and weight of a wearable display. Lightweight and compact near-eye displays reduce the strain on user's head and neck, and are generally more comfortable to wear. Typically, an optics block is one of heaviest modules of the display. Compact planar optical components, such as waveguides, gratings, Fresnel lenses, etc., can be used to reduce size and weight of an optics block. However, compact planar optics may be prone to optical distortions and aberrations.

BRIEF DESCRIPTION OF THE DRAWINGS

Exemplary embodiments will now be described in conjunction with the drawings, in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

An imaging waveguide of a near-eye optical display carries a beam of image light from a projector to an eye of a user. The beam of image light propagates in the waveguide via multiple reflections from inner waveguide surfaces and diffraction on grating structures of the waveguide. There may exist multiple optical paths for propagating beam exiting the waveguide at a particular location of an eyebox. Portions of the beam propagating along these multiple optical paths may interfere with one another causing brightness and color variation of the observed image. In accordance with the disclosure, a diffraction grating of the waveguide may be configured to provide a spatial variation of optical phase of the portions of the optical beam diffracted by the diffraction grating, destroying or at least reducing the unwanted interference and thereby reducing undesired brightness and color variations of the observed image.

In accordance with the present disclosure, there is provided an optical waveguide comprising a plate of transparent material comprising opposed first and second surfaces for guiding an optical beam therebetween by at least one of reflection or diffraction. A first diffraction grating is disposed at the first surface for spreading the optical beam by diffracting portions thereof into a non-zero diffraction order to propagate inside the plate. The first diffraction grating comprises an array of grooves running parallel to one another and structured to provide a spatial variation of optical phase of the portions of the optical beam diffracted by the first diffraction grating into the non-zero diffraction order.

To provide the spatial variation of optical phase of the portions of the optical beam diffracted by the first diffraction grating into the non-zero diffraction order, the grooves of the first diffraction grating may be made to meander in a plane of the first diffraction grating. The grooves may be spaced apart at a first grating pitch, such that an amplitude of meander of the grooves is no greater than the first grating pitch. The amplitude of meander may be spatially varying, e.g. in a periodic or a pseudo-random pattern. A period of the periodic pattern may be e.g. greater than 2 mm. In some embodiments, the period of the periodic pattern is greater than 2 mm and an amplitude of meander of the grooves is no greater than 500 nm. In some embodiments, the spatial variation of optical phase is no greater than 2πc. The first diffraction grating may include a surface-relief diffraction grating. The grooves of the surface relief diffraction grating may have a spatially varying fill factor for providing the spatial variation of optical phase of the portions of the optical beam diffracted by the first diffraction grating.

A second diffraction grating may be provided at the second surface for outputting the optical beam by diffracting portions thereof to propagate out of the plate. The second diffraction grating may be laterally offset from the first diffraction grating in a direction of diffraction of the portions of the optical beam on the first diffraction grating. In embodiments where the second diffraction grating is disposed opposite the first diffraction grating, the second diffraction grating may include an array of grooves running parallel to one another and structured to provide a spatial variation of optical phase of the portions of the optical beam diffracted by the second diffraction grating. The optical waveguide may include an input coupler for coupling the optical beam into the optical waveguide.

In accordance with an aspect of the present disclosure, there is further provided an optics block for a near-eye display, the optics block comprising a waveguide described above and an image source optically coupled to the input coupler for providing the optical beam thereto. In operation, the optical beam carries an image to be displayed by the near-eye display.

In accordance with an aspect of the present disclosure, there is further provided a method for reducing a spatial variation of throughput of an optical waveguide comprising a plate of transparent material having opposed first and second surfaces for guiding an optical beam therebetween by at least one of reflection or diffraction. The method may include providing a first diffraction grating at the first surface of the plate, for spreading the optical beam by diffracting portions thereof into a non-zero diffraction order to propagate inside the plate. The first diffraction grating may include an array of grooves running parallel to one another and structured to provide a spatial variation of optical phase of the portions of the optical beam diffracted by the first diffraction grating into the non-zero diffraction order. The grooves of the first diffraction grating may be meandering in a plane of the first diffraction grating to provide the spatial variation of optical phase of the portions of the optical beam diffracted by the first diffraction grating. The grooves may have a spatially varying duty cycle for providing the spatial variation of optical phase of the portions of the optical beam diffracted by the first diffraction grating.

Figure 1A:
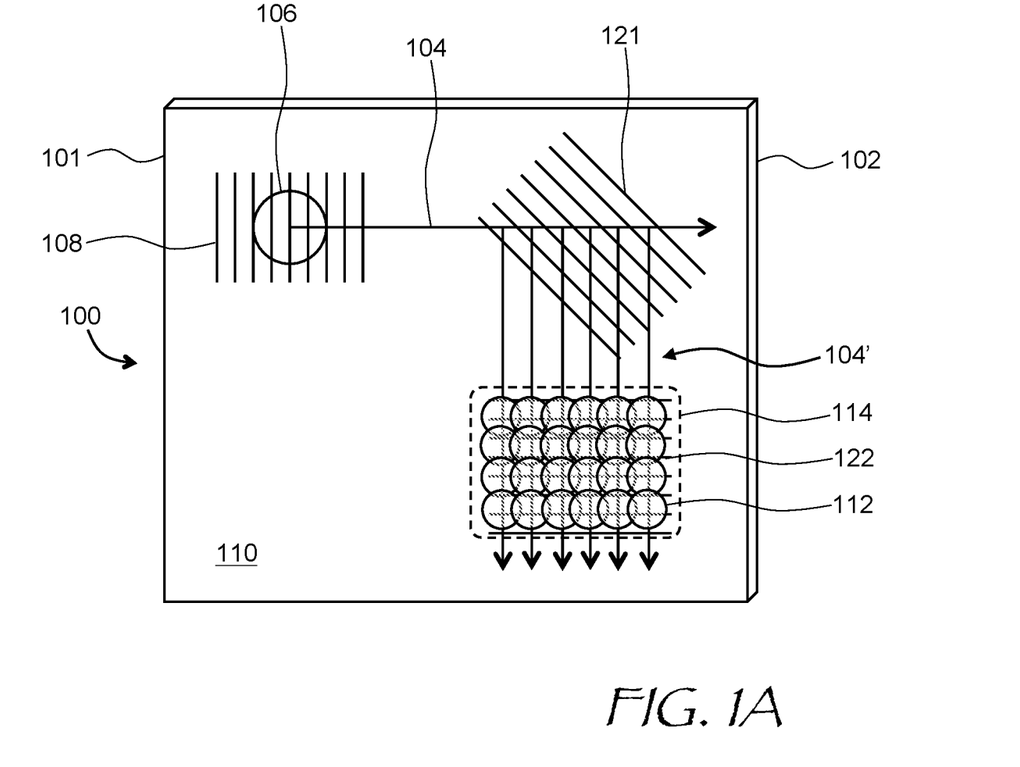
FIG. 1A is a plan view of an optical waveguide for pupil expansion in a near-eye display.

Referring now to FIG. 1A, an optical waveguide 100 includes a plate 110 of transparent material comprising opposed first 101 and second 102 surfaces for guiding an optical beam 104 between the first 101 and second 102 surfaces by total internal reflection (TIR) inside the plate 110 in a zigzag pattern spanning between the first 101 and second 102 surfaces. The zigzag pattern is not seen as such, as it is viewed from top in FIG. 1A. The optical beam 104 may be generated by an image source 106. The image source 106 may generate an image in angular domain, which is carried by the diverging optical beam 104. Herein, the term "image in angular domain" means image, in which different elements of the image (pixels) are represented by angles of corresponding rays of the optical beam 104. The optical beam 104 is coupled into the optical waveguide 100 by an input coupler, e.g. a diffraction grating coupler 108. The plate 110 may be made of glass, quartz, sapphire, etc., or any other material sufficiently transparent for transmitting through at least a portion of incoming light, at wavelength(s) of the optical beam 104. The first 101 and second 102 surfaces are made to be parallel to each other; however, manufacturing tolerances may lead to wedging or waving of the plate 110, which may lead to undesired brightness/color variation, as explained below.

A first diffraction grating 121 is disposed at the first surface 101 for spreading the optical beam 104 by diffracting portions 104' of the optical beam 104 into a non-zero, e.g. first, diffraction order to propagate inside the plate 110. The diffracted portions 104' of the optical beam 104 propagate, via TIR in zigzag pattern, towards a second diffraction grating 122, which is laterally offset from the first diffraction grating 121 in the direction of diffraction of the portions 104' of the optical beam 104, i.e. downwards in FIG. 1A. The second diffraction grating 122 out-couples the portions 104' via diffraction, at multiple locations represented by circles 112, which together define an eyebox 114, i.e. an area when a good-quality image may be directly observed by a user.

Figure 1B:
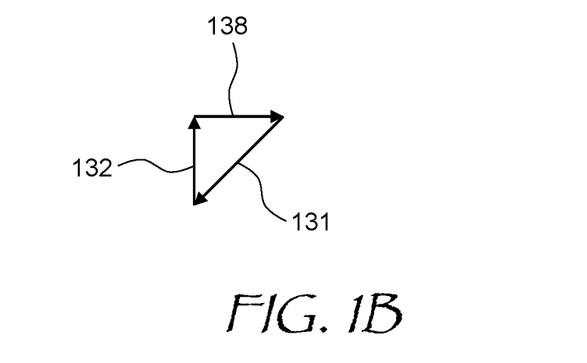
FIG. 1B is a k-vector plot corresponding to beam propagation in the optical waveguide of FIG. 1A.

To carry the image with as few distortions as possible, the ray angles in the optical beam 104 need to be preserved for all rays within a field of view (FOV) of the display. The diffraction grating coupler 108 and the first 121 and second 122 diffraction gratings may be configured to fulfill that condition. Referring to FIG. 1B, an in-coupling k-vector 138 of the diffraction grating coupler 108, a first k-vector 131 of the first diffraction grating 121, and a second k-vector 132 of the second diffraction grating 122 are sized and oriented such that the vector sum of these three k-vectors is zero. When this condition is fulfilled, the ray angles in the optical beam 104 can be preserved.

Figure 2A:
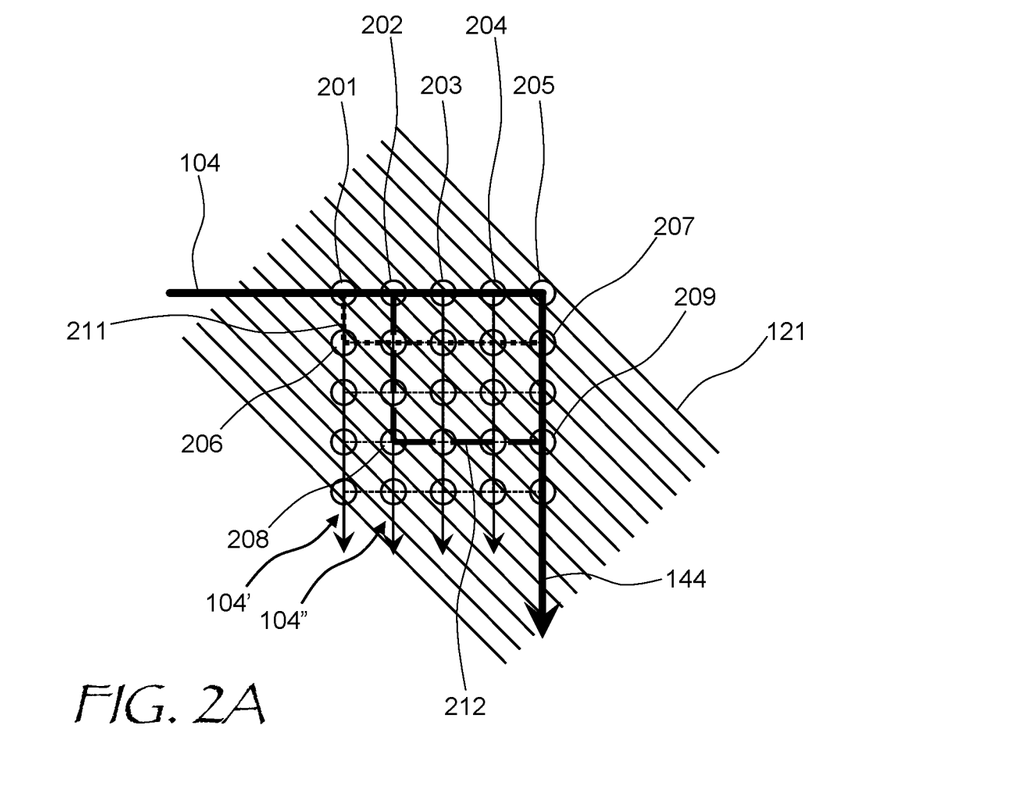
FIG. 2A is a magnified view of the optical waveguide of FIG. 1A showing multiple paths of an optical beam.
Figure 2B:
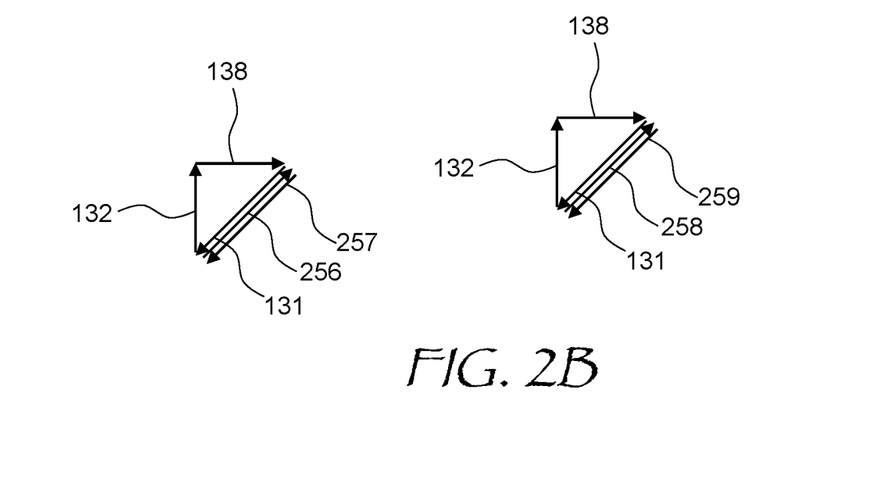
FIG. 2B is a k-vector plot corresponding to multi-path beam propagation of FIG. 2A.

Referring to FIG. 2A, the beam spreading function of the first diffraction grating 121 is further illustrated. The optical beam 104 diffracts on the first diffraction grating 121 at multiple locations 201, 202, 203, 204, and 205 producing portions 104', 104", and 144 propagating downwards in FIG. 2A. The optical paths of a selected portion 144 will be now considered. The main optical path includes a diffraction at the fifth location 205, and is denoted with a solid arrow. Multiple optical paths are available for the selected portion 144. For instance, a first additional optical path 211 is available (shown in dotted line). When propagating along the first additional optical path 211, a first optical beam portion 104' is diffracted at the first location 201, then at a sixth location 206, and then at a seventh location 207. A second additional optical path 212 is also available (shown in long-dashed line). When propagating along the second additional optical path 212, a second optical beam portion 104" is diffracted at the second location 202, then at an eighth location 208, and then at a ninth location 209. The first 204' and second 204" beam portions interfere with the main portion 144. If the plate 110 (FIG. 1A) were perfectly straight and plano-parallel, the interference would have a same effect across the first diffraction grating 121; however, the plate 110 is rarely perfectly flat and plano-parallel, which causes the throughout of the waveguide 100 to be spatially variant. The situation is exacerbated by the fact that the optical path lengths of the first 211, second 212, and the main optical path of the selected portion 144 are all the same, such that a finite spectral bandwidth of the optical beam does not reduce the optical interference by much. It is further noted that, as evidenced by FIG. 2B, the vector sum of k-vectors is also zero for the additional optical paths 211 and 212. This happens because a k-vector 256 corresponding to diffraction at the sixth location 206 and a k-vector 257 corresponding to diffraction at the seventh location 207 cancel each other, and k-vectors 258 corresponding to diffraction at the eighth location 208 and 259 corresponding to diffraction at the ninth location 209 also cancel each other.

Figure 3:
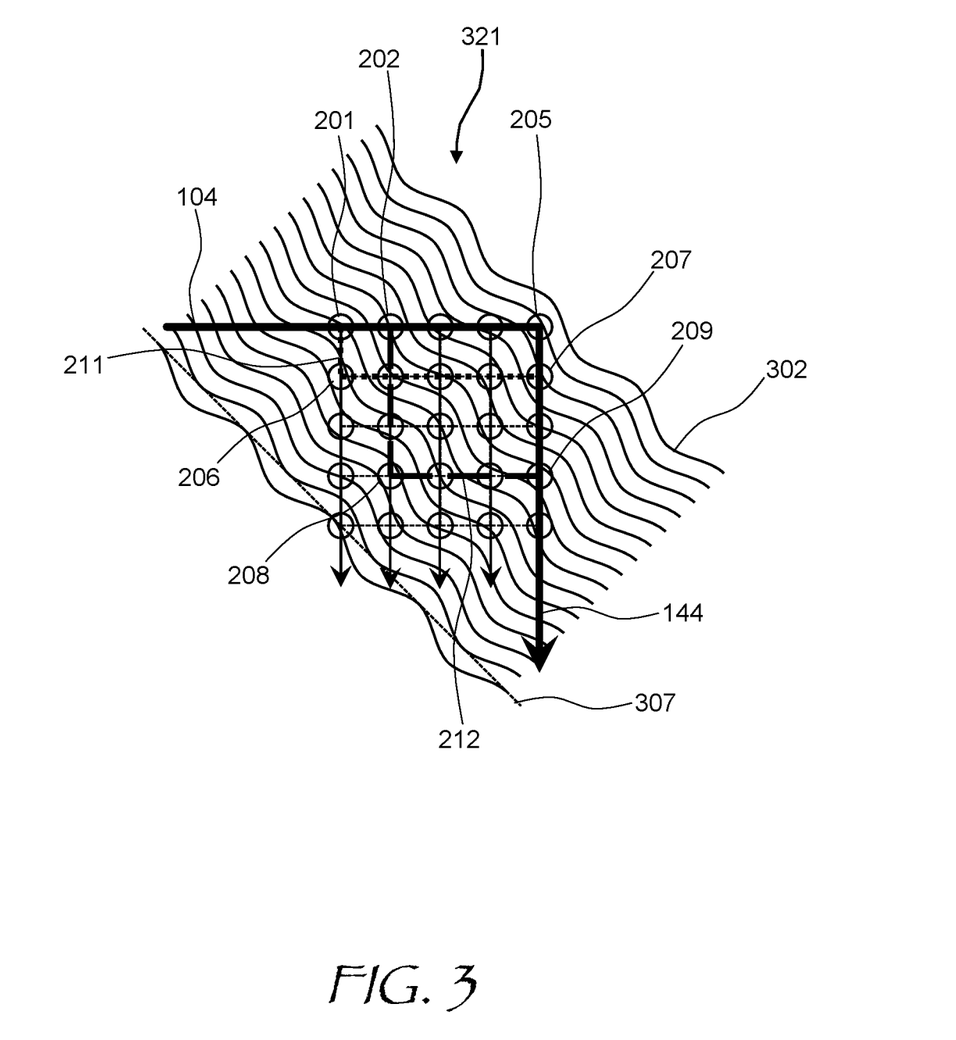
FIG. 3 is a magnified view of an optical waveguide structured to provide a spatial variation of optical phase by meandering the grating grooves.

Turning now to FIG. 3, a diffraction grating 321 may be used in place of the first diffraction grating 121 of the waveguide 100 of FIG. 1A. The diffraction grating 321 of FIG. 3 may be a surface relief grating and may include an array of grooves 302 running parallel to one another and meandering, i.e. waving, in a plane of the diffraction grating 321 to provide a spatial variation of optical phase of the portions 104', 104", 144 of the optical beam 104 diffracted by the diffraction grating 321 into the non-zero diffraction order. The spatial variation of the optical phase suppresses, i.e. averages out, undesired interference effects due to a pseudo-random nature of optical interference with added pseudo-random phase shifts. At the same time, a reduction of a modulation transfer function (MTF) due to the added random phase is minimal, since for the main portion 144 the randomly varying optical phase shift is added only once, at the diffraction at the fifth location 205 (FIG. 2A), while for the first 211, second 212, and other similar additional optical paths, the randomly varying optical phase shift is added three or more times. The amplitude of meandering is greatly exaggerated in FIG. 3 for the purposes of illustration.

The required amplitude of meander of the grooves 302 is typically very small. This is because the variation of optical phase required to reduce the interference-caused throughput non-uniformity of the waveguide 100 is quite small, e.g. no greater than 2πc. In some embodiments, an amplitude of meander is no greater than a grating pitch of the grating grooves 302, i.e. no greater than a distance between neighboring grooves 302. This is illustrated schematically by a straight line 307. For a sinusoidal meandering, a period of the sinusoidal pattern may be greater than 2 mm at a grating pitch of less than one micrometer. In another non-limiting example, the period of the sinusoidal pattern is greater than 2 mm and an amplitude of meander of the grooves is no greater than 500 nm. The meandering does not need to be sinusoidal; any other smooth periodic or aperiodic, or even a completely random or pseudo-random meandering pattern may also be used. The amplitude of meander may be constant or spatially varying for further optimization of image quality.

Figure 4:
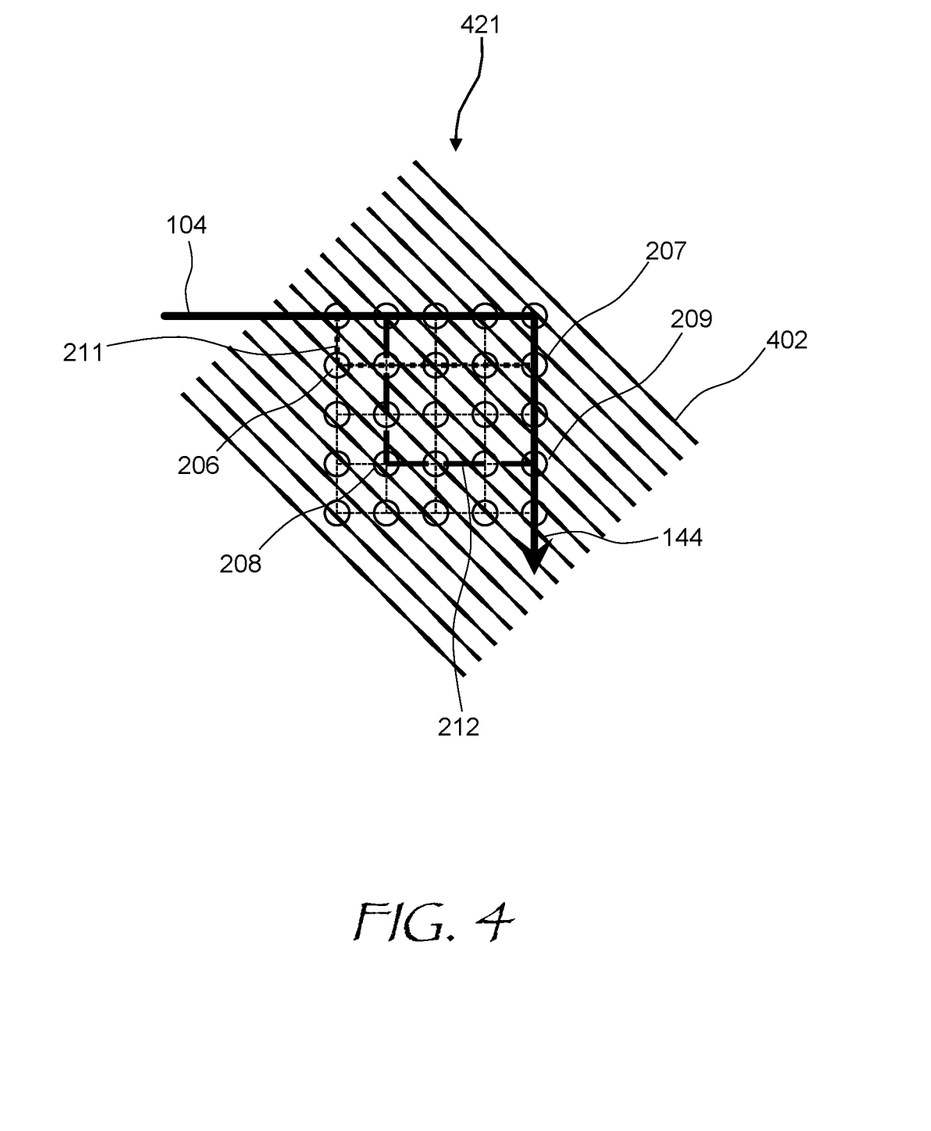
FIG. 4 is a magnified view of an optical waveguide structured to provide a spatial variation of optical phase by spatially varying fill factor of the diffraction grating.

The spatial variation of optical phase of the portions of the optical beam diffracted by the first diffraction grating into the non-zero diffraction order may be achieved in a variety of ways. In a non-limiting example illustrated in FIG. 4, grooves 402 of the surface relief diffraction grating 421 run parallel to one another and have a spatially varying duty cycle, or fill factor, for providing the spatial variation of optical phase of the portions of the optical beam diffracted by the diffraction grating 421. The spatially varying fill factor may be achieved e.g. by varying thickness or width of the diffraction grooves themselves, as represented schematically in FIG. 4 by a spatially varying thickness of solid lines representing the grating grooves 402.

Figure 5:
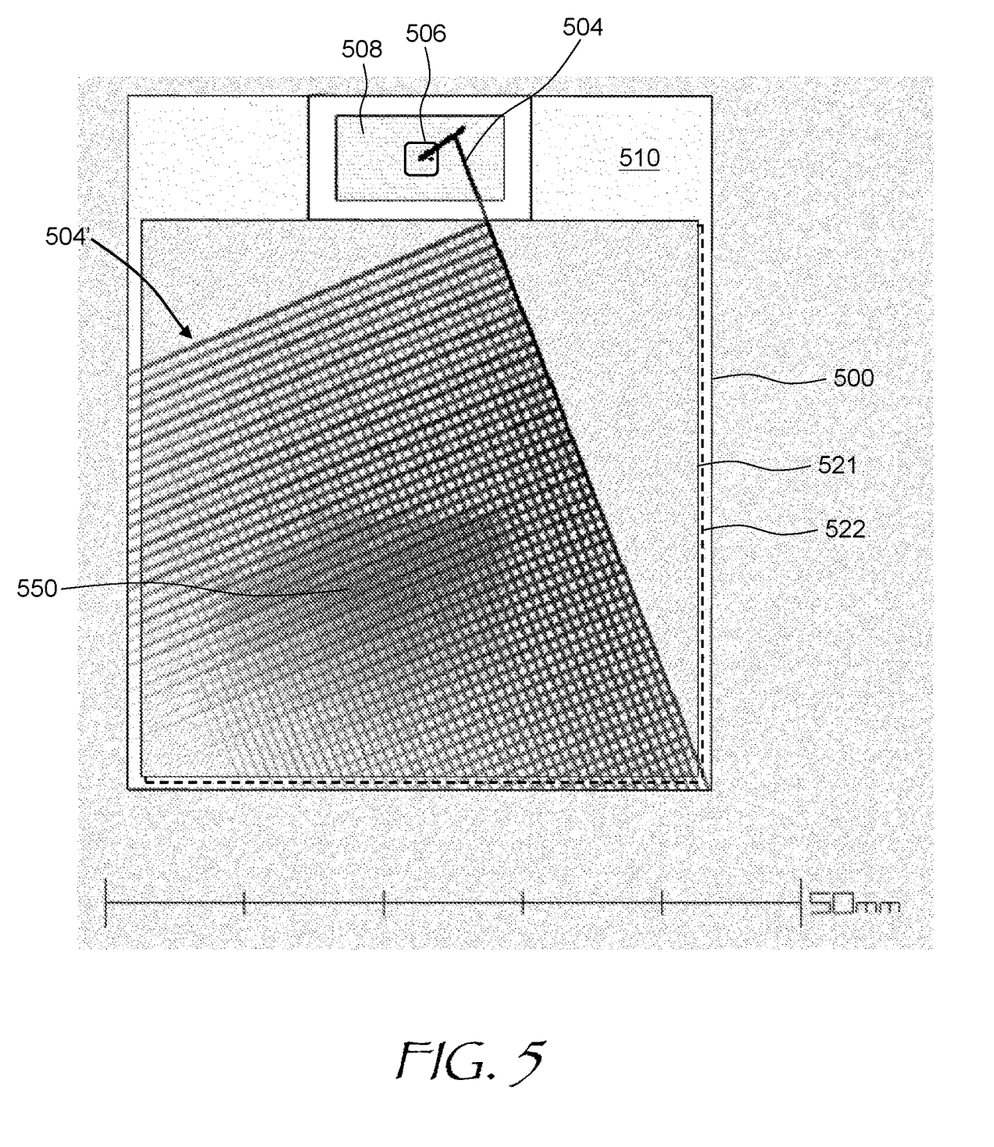
FIG. 5 is a plan view of an optical waveguide for a near-eye display showing a simulated ray-traced expanded optical beam.

Turning to FIG. 5, a result of ray-tracing an optical beam 504 in a beam-expanding waveguide 500 is shown. The image scale is shown at the bottom of FIG. 5. The beam-expanding waveguide 500 includes a transparent plano-parallel plate 510 supporting an input coupler 508 for coupling an optical beam 504 emitted by an image source 506 into the beam-expanding waveguide 500. A first diffraction grating 521 (shown by solid lines) is disposed at a front surface of the plate 510. The first diffraction grating 521 expands the optical beam 504 by diffracting portions 504' of the optical beam 504 propagating in the plate 510 in a zigzag pattern by TIR from inside the plate 510 towards bottom-left corner in FIG. 5. A second diffraction grating 522 (shown by dashed lines) is disposed at a rear surface of the plate 510. The second diffraction grating 522 out-couples the portions 504' of the optical beam 504 from the plate 510, as indicated by darker areas 550. A rhomboidal expanding pattern of beam portions 504' is obtained in this simulation. Each turn of the optical beam 504 or its portions 504' towards the bottom-left corner in FIG. 5 corresponds to diffraction on the diffraction grating 521, while straight sections of the optical beams directed towards bottom-right corner in FIG. 5 correspond to propagation of the optical beam portions 504' via TIR on a surface of the plate 510 and zero-order diffraction on the first diffraction grating 521. In such a configuration, each diffraction of the optical beam 504 or its portions 504' by the second diffraction grating 522 can be followed by a secondary diffraction of the diffracted light by the first diffraction grating 521, which may further increase field of view of the beam-expanding waveguide 500.

Figure 6:
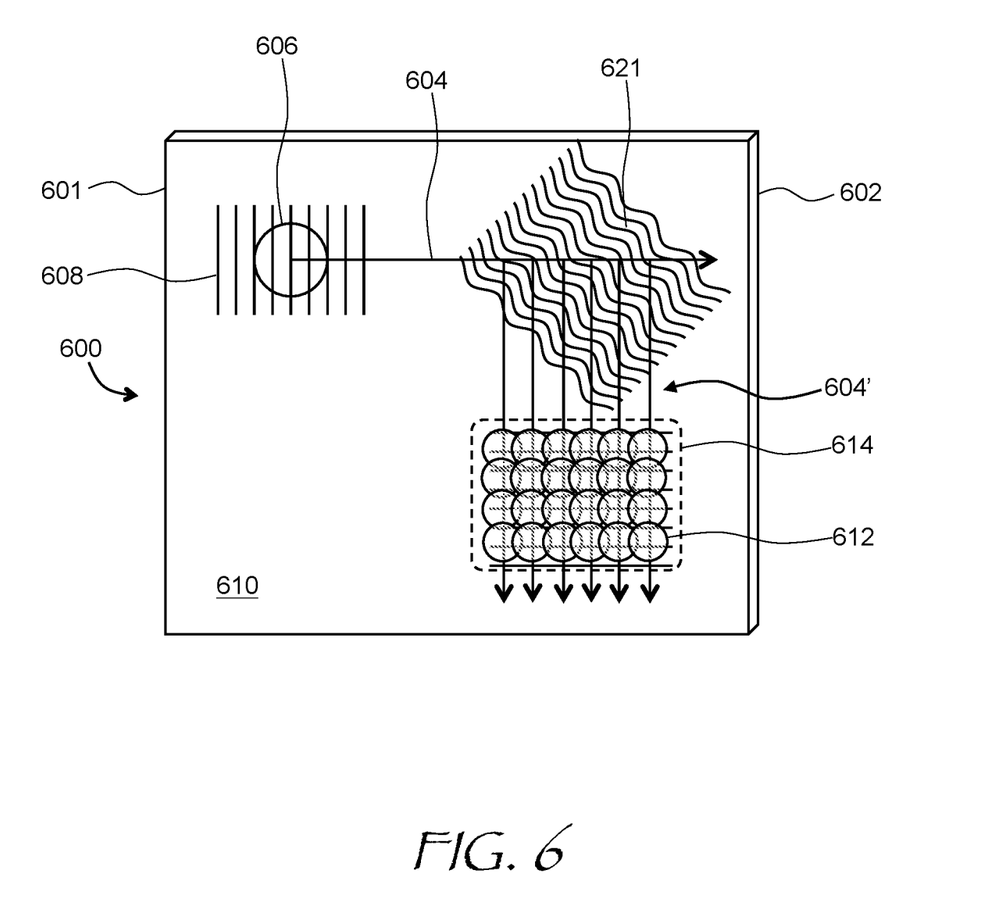
FIG. 6 is a plan view of an optical waveguide with meandering diffraction grating grooves with offset diffraction gratings.

Referring now to FIG. 6, an optical waveguide 600 is similar to the optical waveguide 100 of FIG. 1A. The optical waveguide 600 includes a plate 610 of transparent material having opposed first 601 and second 602 surfaces for guiding an optical beam 604 between the first 601 and second 602 surfaces by total internal reflection (TIR) from inside the plate 610 in a zigzag pattern. The optical beam 604 may be generated by an image source 606. The image source 606 may generate image in angular domain. This image is carried by the diverging optical beam 604. The optical beam 604 is coupled into the optical waveguide 600 by an input grating coupler 608. The plate 610 may be made of glass, quartz, sapphire, etc., or any other material transparent, i.e. transmitting through at least a portion of incoming light, at wavelength(s) of the optical beam 604. A first diffraction grating 621 with meandering grooves is similar to the diffraction grating 321 of FIG. 3 in that it provides the spatial variation of optical phase of the portions of the optical beam diffracted by the first diffraction grating 621 into the non-zero diffraction order. A diffraction grating with spatially varying fill factor or duty cycle, similar to the diffraction grating 421 of FIG. 4, may also be used. A second diffraction grating 622 is laterally offset from the first diffraction grating 621 in a direction of diffraction of portions 604' of the optical beam 604 on the first diffraction grating 621. The second diffraction grating 621 may be disposed on the first 601 or second 602 surface of the plate 610.

Figure 7A:
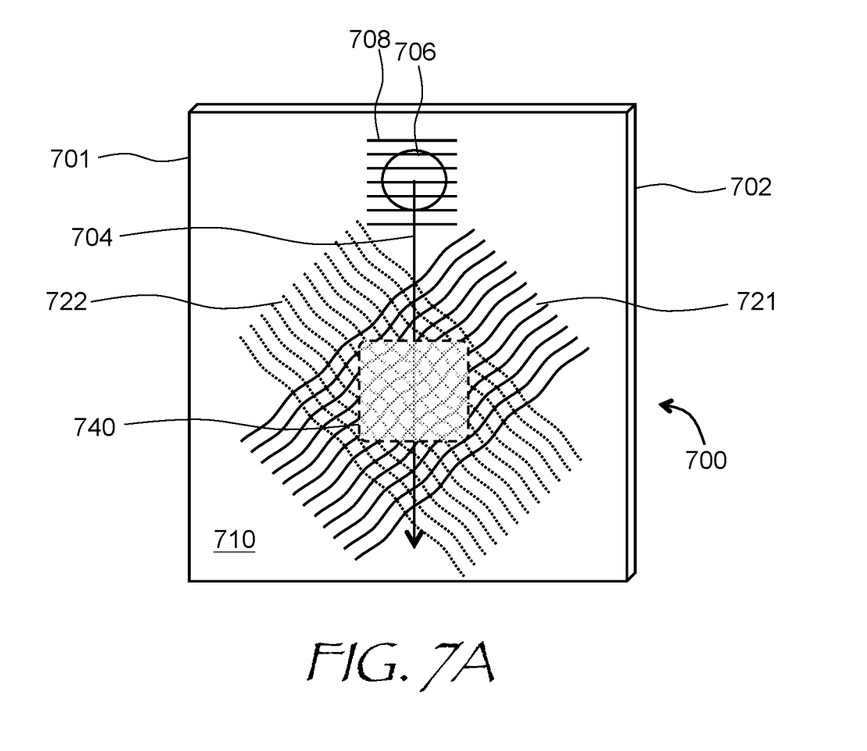
FIG. 7A a plan view of an optical waveguide with meandering diffraction grating grooves with superimposed diffraction gratings.

In some embodiments, the diffraction gratings may be disposed against one another on opposed surfaces of the waveguide. FIG. 7A illustrates such an embodiment. Similarly to the above described optical waveguide 600 of FIG. 6, an optical waveguide 700 of FIG. 7A is based on a plate 710 of transparent material having opposed first 701 and second 702 surfaces for guiding an optical beam 704 between the first 701 and second 702 surfaces by TIR and/or diffraction. The optical beam 704 may be generated by an image source 706 disposed behind or in front of the waveguide 700. The image source 706 may generate image in angular domain to be carried by the diverging optical beam 704. The optical beam 104 is coupled into the optical waveguide 600 by an input grating coupler 708. A first diffraction grating 721 with meandering grooves shown in solid lines is similar to the diffraction grating 321 of FIG. 3.

A second diffraction grating 722 with meandering grooves shown in dotted lines is disposed opposite the first diffraction grating 721, i.e. on the second surface 702 of the plate 710. Grooves of the second diffraction grating 722 run parallel to one another and are meandering to provide a spatial variation of optical phase of the portions of the optical beam 704 diffracted by the second diffraction grating 722. An area of intersection of the first 721 and second 722 diffraction gratings defines an eyebox 740. In some embodiments, the grooves of the first 721 and/or second 722 diffraction grating may have a varying duty cycle, similar to the grooves 402 of the diffraction grating 421 of FIG. 4.

Figure 7B:
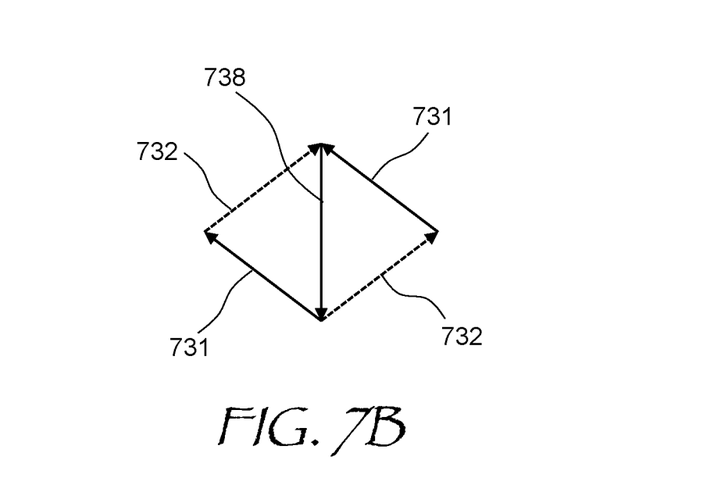
FIG. 7B is a k-vector plot corresponding to normal beam propagation in the optical waveguide of FIG. 7A.

The k-vector diagram for the above configuration of the input grating coupler 108, the first diffraction grating 721, and the second diffraction grating 722 is illustrated in FIG. 7B. An in-coupling k-vector 738 is oriented downwards in this example. A pair of first k-vectors 731 (solid arrows) corresponds to the first diffraction grating 721, and a pair of second k-vectors 732 (dashed arrows) corresponds to the second diffraction grating 722. The optical beam 704, directed downwards by the input grating coupler 708, is diffracted by both the first 721 and second 722 diffraction gratings in two different directions corresponding to the left and right triangles in FIG. 7B, formed by the k-vectors 738 (common side of the two triangles), 731, and 732.

Figure 8:
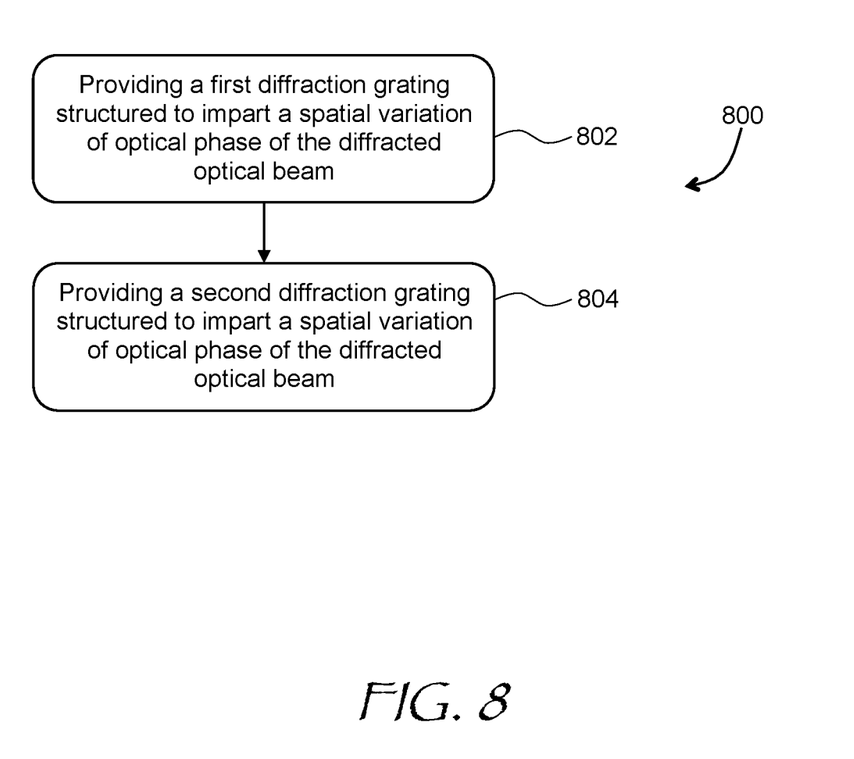
FIG. 8 is a flow chart of a method r reducing a spatial variation of throughput of an optical waveguide according to the present disclosure.

Referring to FIG. 8, a method 800 for reducing a spatial variation of throughput of an optical waveguide including a plate of transparent material, such as the plate 110 of FIG. 1A, 510 of FIG. 5, 610 of FIG. 6, or 710 of FIG. 7A, includes providing (802) a first diffraction grating (e.g., the first diffraction grating 121 of FIG. 1A, the first diffraction grating 521 of FIG. 5, the first diffraction grating 621 of FIG. 6, or the first diffraction grating 721 of FIG. 7A) at the first surface of the plate, for spreading the optical beam by diffracting portions of the optical beam into a non-zero diffraction order to propagate inside the plate. The first diffraction grating comprises an array of parallel grooves structured to impart a spatial variation of optical phase of the portions of the optical beam diffracted by the first diffraction grating into the non-zero diffraction order, as explained above with reference to FIGS. 1A, 5, 6, and 7A. A second diffraction grating may also be provided (804) on the first or second surface of the plate. The second diffraction grating may include an array of parallel grooves, which optionally may also be structured to impart a spatial variation of optical phase of the portions of the optical beam diffracted by the first diffraction grating into the non-zero diffraction order. To provide the spatial variation of optical phase, the grooves of the diffraction grating(s) may be meandered or wiggled, e.g. in a sinusoidal or a pseudo-random pattern, and/or the thickness of the grooves may be spatially varied. Other structural variations of the first and second diffraction gratings may be employed, as well.

Figure 9A:
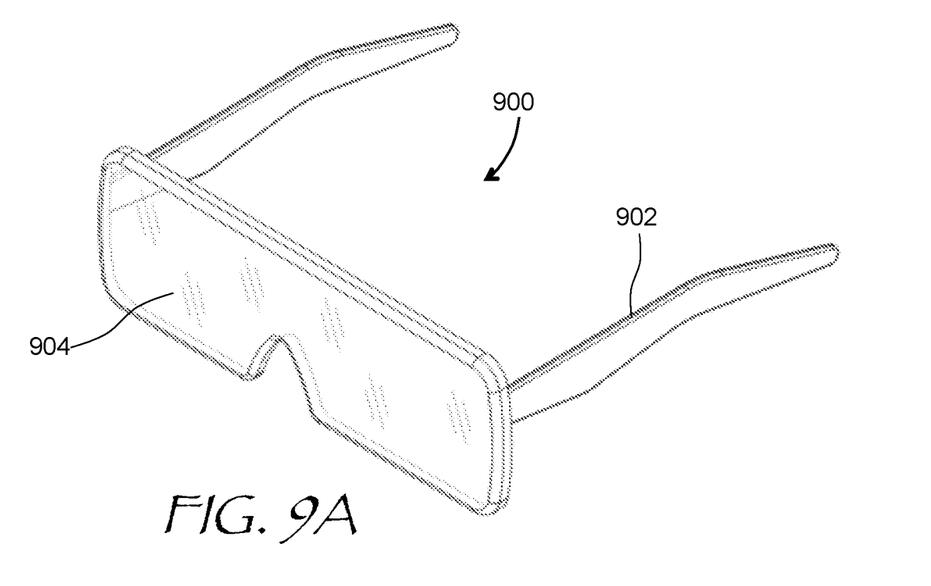
FIG. 9A is an isometric view of an eyeglasses form factor near-eye AR/VR display incorporating an optical waveguide of the present disclosure.
Figure 9B:
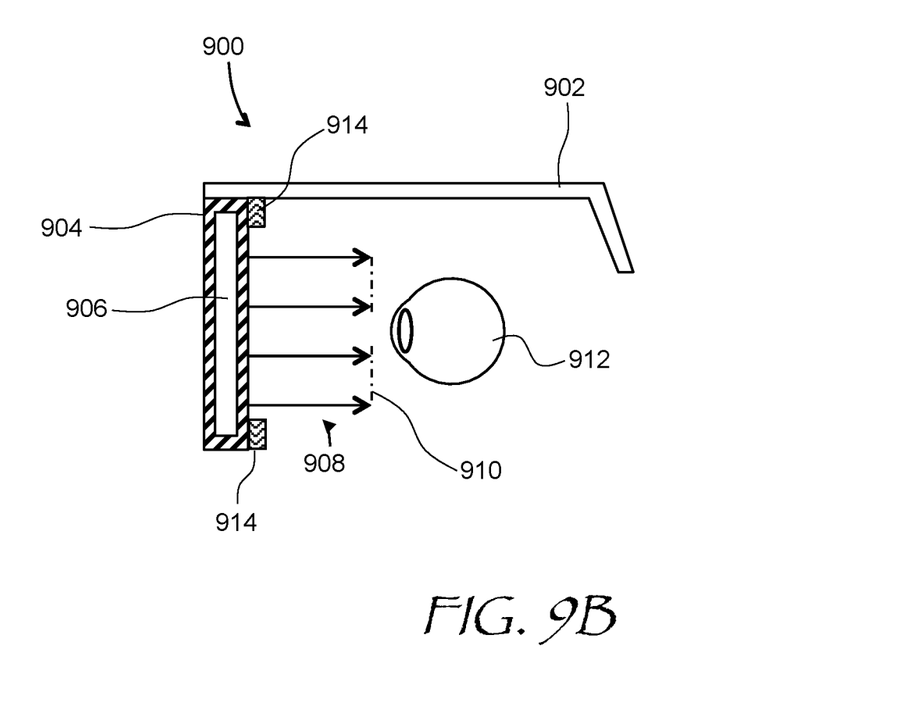
FIG. 9B is a side cross-sectional view of the display of FIG. 9A.

Referring to FIGS. 9A and 9B, a near-eye AR/VR display 900 may include waveguides of the present disclosure, e.g. the waveguide 100 of FIG. 1A, the waveguide 500 of FIG. 5, the waveguide 600 of FIG. 6, or the waveguide 700 of FIG. 7A, to guide image light to eyeboxes 910 of the near-eye AR/VR display 900. A body or frame 902 of the near-eye AR/VR display 900 has a form factor of a pair of eyeglasses, as shown. A display unit 904 includes a display assembly 906 (FIG. 9B) which provides image light 908 to the eyebox 910, i.e. a geometrical area where a good-quality image may be presented to a user's eye 912. The display assembly 906 may include a separate AR/VR display module for each eye, or one AR/VR display module for both eyes. For the latter case, an optical switching device may be coupled to a single electronic display for directing images to the left and right eyes of the user in a time-sequential manner, one frame for left eye and one frame for right eye. The images may be presented fast enough, i.e. with a fast enough frame rate, that the individual eyes do not notice the flicker and perceive smooth, steady images of surrounding virtual or augmented scenery.

An electronic display of the display assembly 906 may include, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. The near-eye AR/VR display 900 may also include an eye-tracking system 914 for determining, in real time, a gaze direction and/or the vergence angle of the user's eyes 912. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, dynamically creating additional objects or pointers, etc. Furthermore, the near-eye AR/VR display 900 may include an audio system, such as small speakers or headphones.

Figure 10:
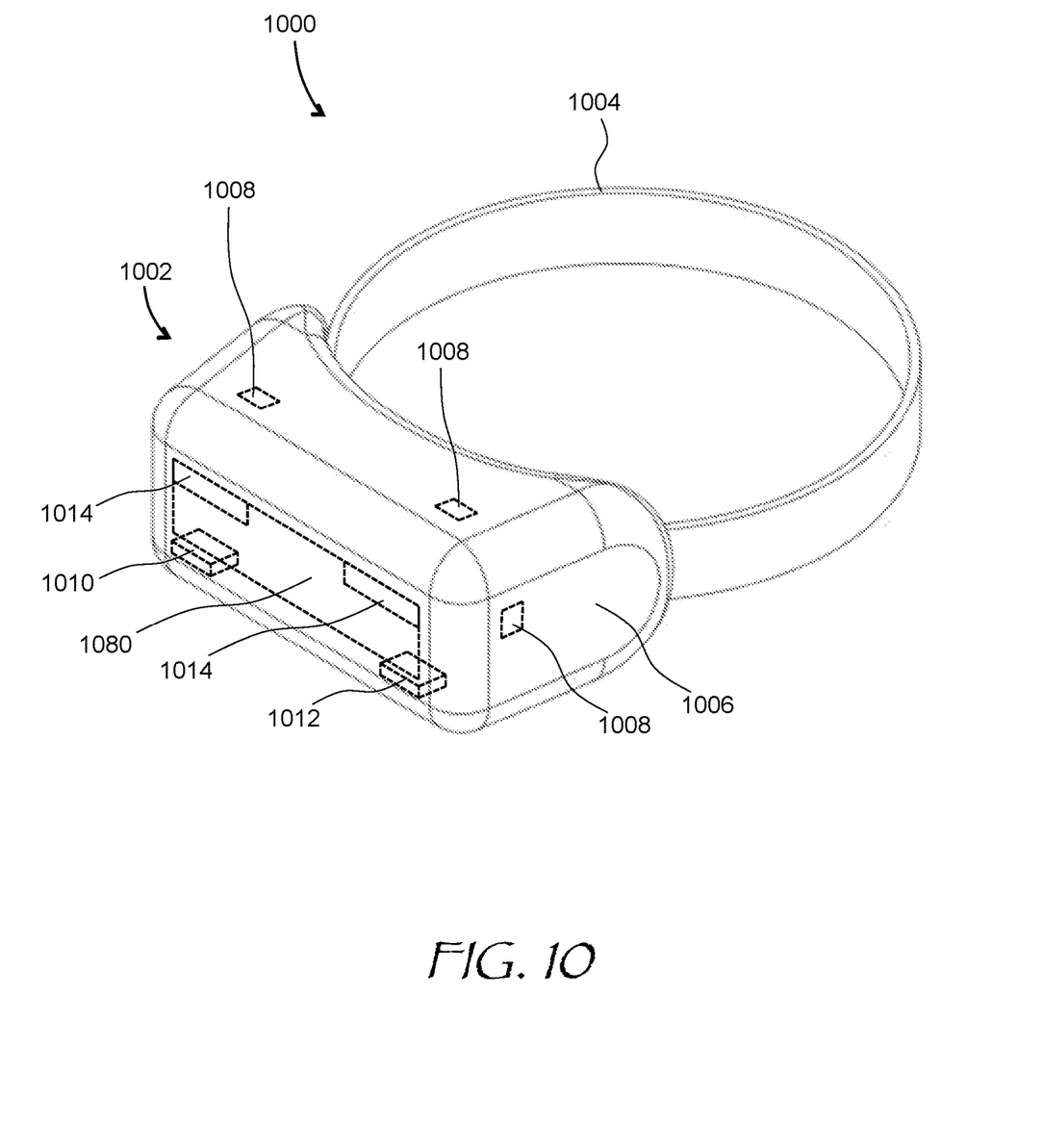
FIG. 10 is an isometric view of a head-mounted display (HMD) incorporating an optical waveguide of the present disclosure.

Turning now to FIG. 10, an HMD 1000 is an example of an AR/VR wearable display system which encloses user's face, for a greater degree of immersion into the AR/VR environment. The HMD 1000 may include waveguides of the present disclosure, e.g. the waveguide 100 of FIG. 1A, the waveguide 500 of FIG. 5, the waveguide 600 of FIG. 6, or the waveguide 700 of FIG. 7A, to guide image light to eyeboxes, not shown, of the HMD 1000. The HMD 1000 can present content to the user as a part of an AR/VR system, which may further include a user position and orientation tracking system, an external camera, a gesture recognition system, control means for providing user input and controls to the system, and a central console for storing software programs and other data for interacting with the user for interacting with the AR/VR environment. The function of the HMD 1000 is to augment views of a physical, real-world environment with computer-generated imagery, and/or to generate entirely virtual 3D imagery. The HMD 1000 may include a front body 1002 and a band 1004. The front body 1002 is configured for placement in front of eyes of a user in a reliable and comfortable manner, and the band 1004 may be stretched to secure the front body 1002 on the user's head. A display system 1080 may be disposed in the front body 1002 for presenting AR/VR imagery to the user. Sides 1006 of the front body 1002 may be opaque or transparent.

In some embodiments, the front body 1002 includes locators 1008, an inertial measurement unit (IMU) 1010 for tracking acceleration of the HMD 1000, and position sensors 1012 for tracking position of the HMD 1000. The locators 1008 are traced by an external imaging device of a virtual reality system, such that the virtual reality system can track the location and orientation of the entire HMD 1000. Information generated by the IMU and the position sensors 1012 may be compared with the position and orientation obtained by tracking the locators 1008, for improved tracking of position and orientation of the HMD 1000. Accurate position and orientation is important for presenting appropriate virtual scenery to the user as the latter moves and turns in 3D space.

The HMD 1000 may further include an eye tracking system 1014, which determines orientation and position of user's eyes in real time. The obtained position and orientation of the eyes allows the HMD 1000 to determine the gaze direction of the user and to adjust the image generated by the display system 1080 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1002.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An optical waveguide comprising:
    a plate of transparent material comprising opposed first and second surfaces for guiding an optical beam therebetween by at least one of reflection or diffraction; and
    a first diffraction grating at the first surface for spreading the optical beam by diffracting portions thereof into a non-zero diffraction order to propagate inside the plate;
    wherein the first diffraction grating comprises an array of grooves running parallel to one another and meandering in a plane of the first diffraction grating to provide a spatial variation of optical phase of the portions of the optical beam diffracted by the first diffraction grating into the non-zero diffraction order.

2. The optical waveguide of claim 1, wherein the grooves are spaced apart at a first grating pitch, wherein an amplitude of meander of the grooves is no greater than the first grating pitch.

3. The optical waveguide of claim 2, wherein the amplitude of meander is spatially varying.

4. The optical waveguide of claim 1, wherein the grooves are meandering in a periodic pattern.

5. The optical waveguide of claim 4, wherein a period of the periodic pattern is greater than 2 mm.

6. The optical waveguide of claim 5, wherein the period of the periodic pattern is greater than 2 mm and an amplitude of meander of the grooves is no greater than 500 nm.

7. The optical waveguide of claim 1, wherein the grooves are meandering in a pseudo-random pattern.

8. The optical waveguide of claim 1, wherein the first diffraction grating comprises a surface-relief diffraction grating.

9. The optical waveguide of claim 8, wherein the grooves of the surface relief diffraction grating have a spatially varying fill factor for providing the spatial variation of optical phase of the portions of the optical beam diffracted by the first diffraction grating.

10. The optical waveguide of claim 1, wherein the spatial variation of optical phase is no greater than $2\pi$.

11. The optical waveguide of claim 1, further comprising a second diffraction grating at the second surface for outputting the optical beam by diffracting portions thereof to propagate out of the plate.

12. The optical waveguide of claim 11, wherein the second diffraction grating is laterally offset from the first diffraction grating in a direction of diffraction of the portions of the optical beam on the first diffraction grating.

13. The optical waveguide of claim 11, wherein the second diffraction grating is disposed opposite the first diffraction grating and comprises an array of grooves running parallel to one another and structured to provide a spatial variation of optical phase of the portions of the optical beam diffracted by the second diffraction grating.

14. The optical waveguide of claim 1, further comprising an input coupler for coupling the optical beam into the optical waveguide.

15. An optics block for a near-eye display, the optics block comprising the waveguide of claim 14 and an image source optically coupled to the input coupler for providing the optical beam thereto, wherein in operation, the optical beam carries an image to be displayed by the near-eye display.

16. A method for reducing a spatial variation of throughput of an optical waveguide comprising a plate of transparent material having opposed first and second surfaces for guiding an optical beam therebetween by at least one of reflection or diffraction, the method comprising:
    providing a first diffraction grating at the first surface of the plate, for spreading the optical beam by diffracting portions thereof into a non-zero diffraction order to propagate inside the plate;
    wherein the first diffraction grating comprises an array of grooves running parallel to one another and meandering in a plane of the first diffraction grating to provide a spatial variation of optical phase of the portions of the optical beam diffracted by the first diffraction grating into the non-zero diffraction order.

17. The method of claim 16, wherein the grooves are spaced apart at a first grating pitch, wherein an amplitude of meander of the grooves is no greater than the first grating pitch.

18. The method of claim 16, wherein the grooves of the first diffraction grating have a spatially varying duty cycle for providing the spatial variation of optical phase of the portions of the optical beam diffracted by the first diffraction grating.

* * * * *